United States Patent [19]

Applegate et al.

[11] 4,390,884

[45] Jun. 28, 1983

[54] PRINTHEAD STYLUS ASSEMBLY

[75] Inventors: Steven L. Applegate; Edward R. Lloyd, both of Lexington, Ky.

[73] Assignee: International Business Machines Corporation, Armonk, N.Y.

[21] Appl. No.: 335,975

[22] Filed: Dec. 30, 1981

[51] Int. Cl.³ .......... G01D 15/06

[52] U.S. Cl. .......... 346/139 C; 346/76 PH

[58] Field of Search .......... 346/1.1, 139 A–139 C, 346/76 R, 76 PH; 219/216 PH

[56] References Cited

U.S. PATENT DOCUMENTS

| | | | |
|---|---|---|---|
| 3,421,961 | 1/1969 | Joyce | 156/296 |
| 3,599,228 | 8/1971 | Coco et al. | 346/76 PH |
| 3,810,189 | 5/1974 | Casperson et al. | 346/74 ES |
| 3,965,479 | 6/1976 | Sakamoto et al. | 346/139 C |
| 4,195,937 | 4/1980 | Baran | 400/120 |
| 4,350,448 | 9/1982 | Hanagata et al. | 346/76 PH X |

OTHER PUBLICATIONS

*IBM Technical Disclosure Bulletin,* vol. 22, No. 8A, Jan. 1980, entitled "Thermal Printer Assembly" by J. L. Regehr et al. at pp. 3337–3341.

*Primary Examiner*—Donald A. Griffin
*Attorney, Agent, or Firm*—John A. Brady; George E. Grosser

[57] ABSTRACT

A printhead assembly with a replaceable stylus insert provides for compact connection of contact pads by staggering the contact pads an offset distance that is significantly less than the pad dimension in the direction of offsetting. Preferably the offsets are symmetrically arranged about a reference line and connections are coordinated relative to the reference line so that conductor overlaps are avoided. A compressable means applies pressure to urge the contact pad into intimate engagement and ribs formed in one or both of two clamping sections concentrate pressure along alignments of contact pads.

14 Claims, 6 Drawing Figures

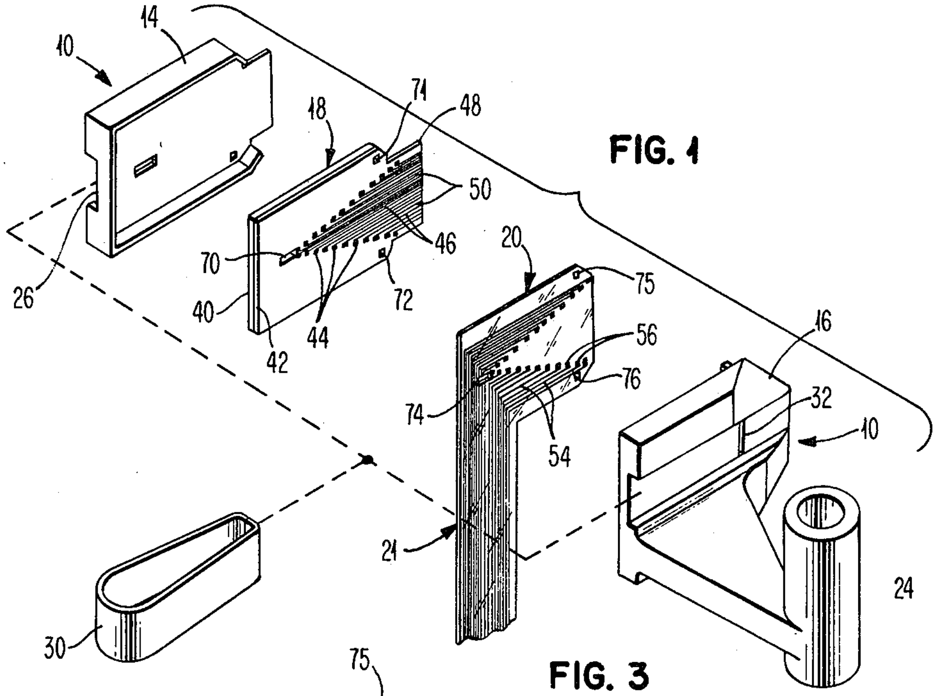
FIG. 1
FIG. 5
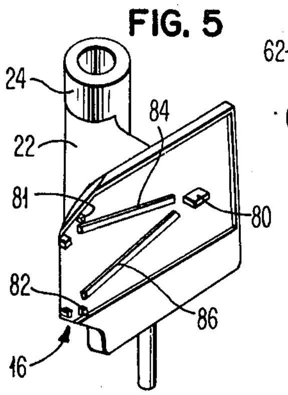
FIG. 3
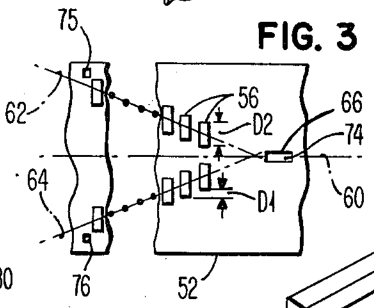
FIG. 2
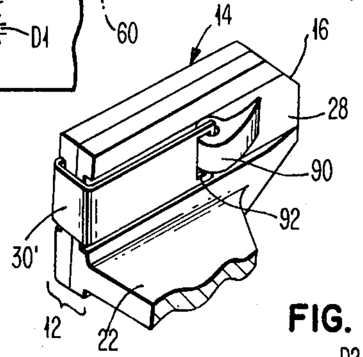
FIG. 4
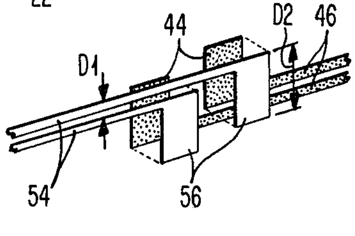
FIG. 6
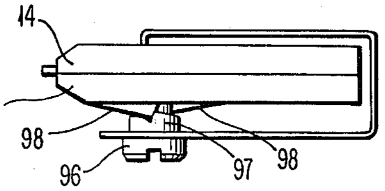

PRINTHEAD STYLUS ASSEMBLY

BACKGROUND OF THE INVENTION

Technical Area

The present invention relates to printheads and, more specifically, to printheads which include a set of spaced elements which receive electrical printing signals which influence a medium such as a ribbon to cause marking.

Art Statement

To achieve high character quality when printing using stylus elements that receive electrical printing signals for influencing a marking medium, such as a resistive marking ribbon, a large number (e.g. forty) of closely-spaced elements are employed. Because these elements are subject to different operating requirements than the connecting cable that extends to the printhead driver circuitry, it is usually desirable to have a transition in materials at the printhead. A problem arises, however, regarding the connection which is desirably reliable and compact yet involves a large number of individual electrical paths. In the case of a resistive ribbon printer, the elements are electrodes that apply electrical signals to the ribbon and are desirably of a wear resistant conducting material such as stainless steel. Cable conductors are, on the other hand, usually made of copper.

One common connection practice is to permanently bond the connection cable to an electrode bearing stylus section (e.g see U.S. Pat. No. 4,195,937 at FIG. 5). A second approach involves the use of corresponding arrangements of contact pads with compressible conducting balls inserted therebetween (e.g. see January 1980 IBM Technical Disclosure Bulletin at pages 3337-3341). It is also known to use the cable conductor material as the electrode material and eliminate any transition (see, e.g. U.S. Pat. No. 3,810,189).

BRIEF SUMMARY OF THE INVENTION

The present invention provides a compact printhead electrode insert for connecting with a termination of a flat connector cable without any overlapping of conductors adjacent the individual connection sites. By so arranging contact pads on both the insert and the cable termination that they are offset from a reference line a distance significantly less than the pad dimension in the offset direction, a compact connection pattern is achieved. Preferably, symmetrical offsets occur on either side of the reference line and the offset matches the conductor spacing for the cable.

For such an insert with symmetrical offsets, the electrode-conductor connections are, preferably, located on the ends of the contact pads facing the reference line in order to permit convenient focusing of the electrode tip sections and provide for high resolution printing. The cable-conductor connections to the corresponding contact pads are, preferably, located on the ends of the contact pads facing away from the reference line. With this arrangement, the contact pads are located along lines that tend to intersect at a vertex (an arrow pattern) and connection without conductor crossovers is conveniently achieved. Alignment features such as accurately positioned slots are, for a preferred implementation, arranged adjacent the ends of the lines of contact pads to assure accurate pad registration.

The printhead insert, according to a presently preferred implementation, includes a compressable backing sheet that serves, when compressed, to urge the contact pads of the insert into intimate engagement with the cable termination contact pads. The backing sheet preferably extends to the printing edge to urge the electrode to conform to the adjacent medium. Force for compressing the contact pads is provided by clamping sections which, for the presently preferred implementation, receive a spring clip that applies compressive forces.

BRIEF DESCRIPTION OF THE DRAWINGS

The invention will be described in detail with reference to the drawing wherein:

FIG. 1 is an exploded perspective view of a presently preferred printhead assembly according to the invention;

FIG. 2 is a perspective view of a clamping housing for a presently preferred printhead assembly according to the invention;

FIG. 3 is a diagram for emphasizing a contact pad arrangement according to the invention;

FIG. 4 is a simplified perspective view for emphasizing the arrangement of corresponding contact pads for achieving an electrical connection to printhead electrodes.

FIG. 5 is a perspective view that emphasizes a conveniently releasable clamping arrangement for a printhead with a removable electrode insert; and FIG. 6 is a top view of a printhead that serves to emphasize a conveniently releasable clamping arrangement.

DETAILED DESCRIPTION OF PRESENTLY PREFERRED IMPLEMENTATION

Referring to FIGS. 1 and 5, a clamping housing 10 forming part of a printhead assembly 12 includes first and second clamping sections 14 and 16, respectively, that serve to compress a stylus insert 18 against termination section 20 of a cable 21. Preferably, the second clamping section 16 includes a bracket 22 and a pivot sleeve 24 to permit convenient pivotal mounting on a pin (not shown). A drive pin (not shown in FIG. 1) is molded to the second clamping section 16 to receive positioning motion from an actuator (not shown).

Respective channels 26 and 28 are defined in the clamping sections 14 and 16 to receive pressure applying means such as a spring clip 30. The spring clip 30 presses the clamping sections 14 and 16 together with opposing forces to squeeze the stylus insert 18 and the termination section 20 (see also FIG. 2) against each other. A detent 32 can serve to retain the spring clip 30.

A resiliently compressible backing sheet 40 for the stylus insert 18 assures a firm pressure is applied to a support layer 42 which has formed thereon a set of contact pads 44 and a corresponding set of electrode conductors 46 that extend to an edge 48 at which they serve as stylus electrodes 50. It is presently preferred that the stylus electrodes 50, the conductors 46, and the contact pads 44 be formed by etching of a stainless steel layer formed on the support layer 42. The support layer 42 is preferably formed of a high temperature polyimide material. The cable termination 20 includes a flexible support layer 52 (shown to be transparent) and a set of cable conductors 54 that connect with a set of contact pads 56 arranged in a pattern corresponding to that of contact pads 44. As assembled, the contact pads 44 face the contact pads 56 to permit an electrical connection to be produced upon intimate engagement therebetween. The cable conductors 54 and the contact pads 56 (seen through the support layer 52 in FIG. 1) are preferably formed by selectively etching copper as is well known.

Referring to FIG. 3, a presently preferred arrangement for the sets of contact pads 44 (a corresponding pattern is used for contact pads 56) utilizes progressive offsets (see D1) on either side of a reference or center line 60. Preferably, a uniform repeat distance is established for the electrode conductors 46 and the cable conductors 54 which is the same as the offset D1 of the contact pads 44 and 56. With this arrangement, the offset distance D1 may be significantly less than the dimension (D2) of the pad in the offset direction to allow for a relatively large contact area while maintaining a compact connection pattern (see FIG. 4). Moreover, by using such a spacing arrangement, the cable conductors can connect to the contact pads 56 on the end away from the center line 60 and the electrode conductors 46 can connect to the pads 44 on the end toward the center line 60 (see also FIGS. 1 and 4) while avoiding possibilities for conductor overlap. A pattern for the contact pads 44 and 56 is established that tends to follow the lines 62 and 64 which intersect at a vertex 66.

According to one aspect of the invention, aligning features such as the slots 70–72 and 74–76 are provided in the cable termination 20 and the stylus insert 18. Preferably, these slots are arranged at adjacent ends of the alignments for the contact pads 44 and 56 and are in corresponding positions for the stylus insert 18 and the cable termination 20. Projecting alignment pins 80, 81 and 82 are formed on the side of clamping section 16 facing the clamping section 14 (see FIG. 5) and are preferably rectangular in cross-section as is shown. The alignment pins 80, 81 and 82 serve to prevent misregistration of corresponding pairs of contact pads 44 and 56. Concentrating means such as a set of ribs 84 and 86 are arranged at positions corresponding to the pattern lines 62 and 64 to concentrate compression force at the contact pads 44 and 56 to assure a reliable connection.

Referring to FIG. 2 again, a spring clamp 30' is indicated with a camming lever 90 mounted at a slot 92 to permit convenient changing of the stylus insert 18 by an operator. An alternative camming release device of a screw type is denoted 96 in FIG. 6 and includes a camming collar 97 that cooperates with the ramps 98 to allow convenient operator release of pressure to permit replacement of the stylus insert 18.

A printhead assembly including a replacement stylus insert has been described in detail with reference to presently preferred implementation thereof. It will be appreciated that variations and modifications within the scope of the claimed invention will be suggested to those skilled in the art. By way of example, various means may be used to apply compressive forces including screws or bolts. For increased resolution, the electrode tips may be concentrated closer together than the conductor spacing and the electrode conductors would then be angled toward the electrodes at the printing edge. Also, additional electrodes that are not electrically connected may be provided to reduce the effects of edge wear.

What is claimed is:

1. A stylus electrode insert for a printhead comprising:

a backing sheet of resilient compressable material;

a support layer extending over at least a portion of said backing sheet;

a set of spaced electrodes formed on said support layer and extending to a printing edge thereof;

a set of contact pads corresponding, respectively, to the electrodes of said set, which contact pads are staggered in a pattern characterized by an essentially uniform offset distances that are less than contact pad dimension in the direction of the offset; and a set of conductors extending from said electrodes to connect with the respective of said contact pads at end sections thereof projecting as a result of said offset, whereby a compact connection arrangement is achieved.

2. The stylus insert of claim 1 wherein the progression of connections for said electrodes with said conductors corresponds to the progression of connections for said contact pads with said conductors whereby crossovers of conductors are avoided.

3. The stylus insert of claims 1 or 2 wherein the pattern of said contact pads includes similar contact pad alignments on either side of a reference line and the connections of said conductors with said contact pads occur at projecting end sections toward said reference line.

4. The stylus insert of claim 3 wherein registration features are arranged adjacent the ends of said alignments of contact pads.

5. The stylus insert of claim 4 wherein the registration features are rectangular slots.

6. A printhead assembly comprising:

a flat cable having a sequence of parallel cable conductors for transmitting printing signals and a termination section that includes a first set of contact pads which are arranged in staggered alignment(s) with an offset distance less than the pad dimension in the direction of the offset, said cable conductors being connected with respective of said first set of contact pads;

a stylus insert having a support layer with a set of spaced electrodes formed at a printing edge, said electrodes being connected by a sequence of spaced electrode conductors to respective of a second set of contact pads located on said support layer in corresponding arrangement to and facing said first set of contact pads;

first and second clamping sections located on either side of said stylus insert and termination section; and pressure applying means for urging said first and second clamping sections to press said first and second sets of contact pads into intimate engagement whereby a compact electrical connection to said electrodes is established.

7. A printhead assembly according to claim 6 wherein said alignment(s) for said contact pads are symmetrically arranged about a reference line.

8. A printhead assembly according to claim 7 wherein said electrode conductors connect to said second set of contact pads at projecting end sections toward said reference line.

9. A printhead assembly according to claim 8 wherein said cable conductors connect to said first set of contact pads at projecting end sections away from said reference line.

10. A printhead assembly according to claims 7, 8 or 9 wherein registration features are arranged at predefined locations relative to said alignment of said first and second set of contact pads.

11. A printhead assembly according to claim 10 wherein said registration features are slots arranged adjacent to the ends of said alignments and pins formed in one of said clamping sections protrude into said slots whereby misregistration of corresponding of said contact pads is prevented.

12. A printhead assembly according to claims 7, 8 or 9 wherein a compressable sheet is located between said clamping sections for applying firm pressure to said contact pads whereby intimate engagement is achieved.

13. A printhead assembly according to claim 7 wherein ribs are formed in at least one of said clamping sections at locations corresponding to said alignment(s) of said contact pads whereby contact pressure is selectively concentrated.

14. A printhead assembly according to claim 7 wherein said pressure applying means includes an operator manipulable camming device for releasing the force on said clamping sections, whereby replacement of said stylus insert is facilitated.

* * * * *